United States Patent
Pischl

(10) Patent No.: US 8,824,570 B2
(45) Date of Patent: Sep. 2, 2014

(54) COMMUNICATIONS INTERFACE TO DIFFERENTIAL-PAIR CABLING

(75) Inventor: Neven Pischl, Santa Clara, CA (US)

(73) Assignee: Broadcom Corporation, Irvine, CA (US)

(*) Notice: Subject to any disclaimer, the term of this patent is extended or adjusted under 35 U.S.C. 154(b) by 416 days.

(21) Appl. No.: 12/803,818

(22) Filed: Jul. 6, 2010

(65) Prior Publication Data

US 2011/0243254 A1    Oct. 6, 2011

Related U.S. Application Data

(60) Provisional application No. 61/341,875, filed on Apr. 6, 2010.

(51) Int. Cl.
*H04L 25/00* (2006.01)
*H04L 25/02* (2006.01)

(52) U.S. Cl.
CPC ......... *H04L 25/0276* (2013.01); *H04L 25/0274* (2013.01)
USPC ....................................................... 375/257

(58) Field of Classification Search
CPC .......... G01R 27/28; H01R 13/66; H03H 7/00; H03H 7/18; H04B 3/00; H04B 3/28; H04B 15/00
USPC ............. 323/222; 370/395.52, 463, 466, 467, 370/538; 375/257, 258, 377, 285; 398/66; 439/620.11, 620.12, 620.13, 620.05, 439/620.23; 455/517; 600/383; 719/316; 380/266
See application file for complete search history.

(56) References Cited

U.S. PATENT DOCUMENTS

| | | | |
|---|---|---|---|
| 7,575,478 B1 * | 8/2009 | Wei | 439/620.11 |
| 2004/0155720 A1 * | 8/2004 | Yasui et al. | 333/12 |
| 2004/0223617 A1 * | 11/2004 | Corcoran et al. | 380/266 |
| 2009/0108964 A1 * | 4/2009 | Nguyen et al. | 333/24 R |
| 2010/0239029 A1 * | 9/2010 | Komori et al. | 375/257 |

* cited by examiner

*Primary Examiner* — Sam K Ahn
*Assistant Examiner* — Shawkat M Ali
(74) *Attorney, Agent, or Firm* — Oblon, Spivak, McClelland, Maier & Neustadt, L.L.P.

(57) ABSTRACT

Disclosed is a communications interface to connect to a first device and to establish a communication between the first device and a second device over a medium. The communications interface comprises at least one common mode choke having a first end configured to connect to an Ethernet transceiver of the first device. The communications interface further comprises an optional capacitor having a first end coupled to a second end of the at least one common mode choke and having a second end configured to connect to the medium. The communications interface does not include any transformers connected to the second end of the at least one common mode choke. The Ethernet communications is readily adaptable to differential-pair cabling and applications in harsh electromagnetic interference environments, such as automotive, aero-space, air crafts, water crafts, trains, railroad and marine applications, where high rejection of EMI is required.

11 Claims, 5 Drawing Sheets

COMMUNICATIONS INTERFACE TO DIFFERENTIAL-PAIR CABLING

RELATED APPLICATIONS

This application is based on and claims priority from U.S. Provisional Patent Application Ser. No. 61/341,875, filed on Apr. 6, 2010, which is hereby incorporated by reference in its entirety.

BACKGROUND OF THE INVENTION

1. Field of the Invention

The present invention relates generally to communications circuitry. More to particularly, the present invention relates to communications interfaces for networking applications.

2. Background Art

Networking technologies such as Ethernet technologies play a central role in creating reliable, standardized, and cost-effective data communications. A conventional Ethernet network typically employs an interface to connect a transceiver to a communications cable. The communications cable may be a coaxial cable, an optical fiber, or a twisted pair cable made of twisted pairs of insulated wires. A transformer-coupled interface housed within the conventional communications interface isolates the voltages between the transceiver and the communications cable. Such a conventional transformer-coupled interface can limit common-mode noise and effectively link a transceiver to a communications cable.

However, a conventional transformer-coupled communications interface is not easily adaptable to communications applications where harsh electromagnetic interferences (EMI) are present and where high rejection of EMI is required, e.g. high immunity to the external EMI and/or low emission of the internally-generated EMI. Such applications are e.g. automotive, aero-space, aircrafts, water crafts, trains, railroad and marine applications. For example, conventional communications interfaces often require many hand-wound components such as transformers and autotransformers that are often costly. These hand-wound components are also susceptible to manufacturing variations and are generally unacceptable for mobile communications applications where high quality-control and performance are required. Moreover, components within a conventional communications interface are difficult to balance and form a significant source of EMI that can interfere with wireless communications or other mobile devices. These problems are a serious consideration in communications applications that need a high degree of EMI rejection but do not need high-level of voltage isolation between an interface and a cable, such as automotive, aero-space, air crafts, water crafts, trains, railroad and marine communications applications.

Accordingly, there is a need to overcome the drawbacks and deficiencies in the art by providing an interface to a differential-pair cabling for high EMI rejection Ethernet applications.

SUMMARY OF THE INVENTION

The present invention is directed to a communications interface to differential-pair cabling and related method, substantially as shown in and/or described in connection with at least one of the figures, as set forth more completely in the claims.

DETAILED DESCRIPTION OF THE INVENTION

Figure 1:
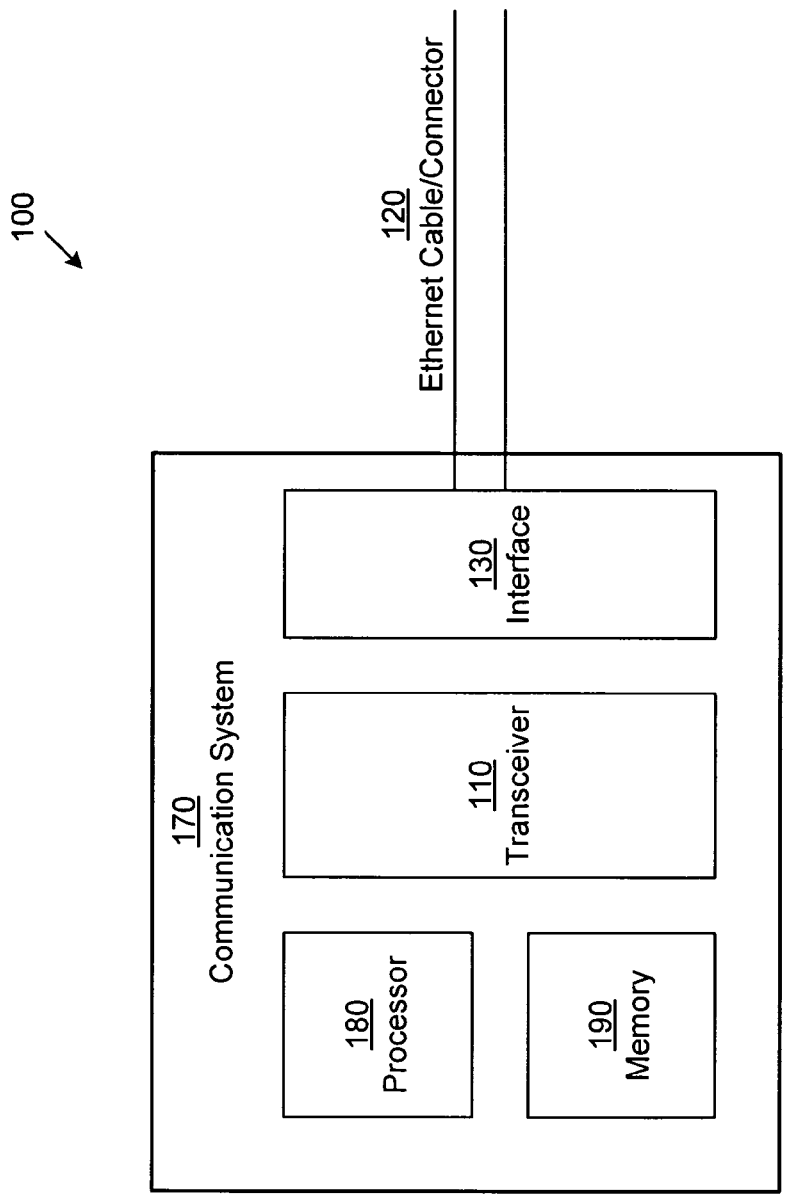
FIG. 1 shows a communication system using a networking technology such as Ethernet technology.

The present invention is directed to a communications interface to differential-pair cabling and related method. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions.

Networking technologies such as Ethernet technologies play a central role in facilitating reliable, standardized, and cost-effective data communications. FIG. 1 shows communication system 100 using a networking technology such as Ethernet technology. Communication system 100 may be incorporated in a harsh EMI application environment, such as an automotive, aero-space, air crafts, water crafts, trains, railroad and marine communication environments. As shown in FIG. 1, communication system 100 comprises processor 180, memory 190, transceiver 110, and interface 130. Interface 130 links Ethernet cable/connector 120 to transceiver 110, which is controlled by processor 180 that can execute communication software program stored in memory 190. Ethernet cable/connector 120 may include one or more pairs of differential-pair cabling, which may comprise at least one pair of insulated wires twisted around one another and configured to facilitate differential signaling.

Figure 2A:
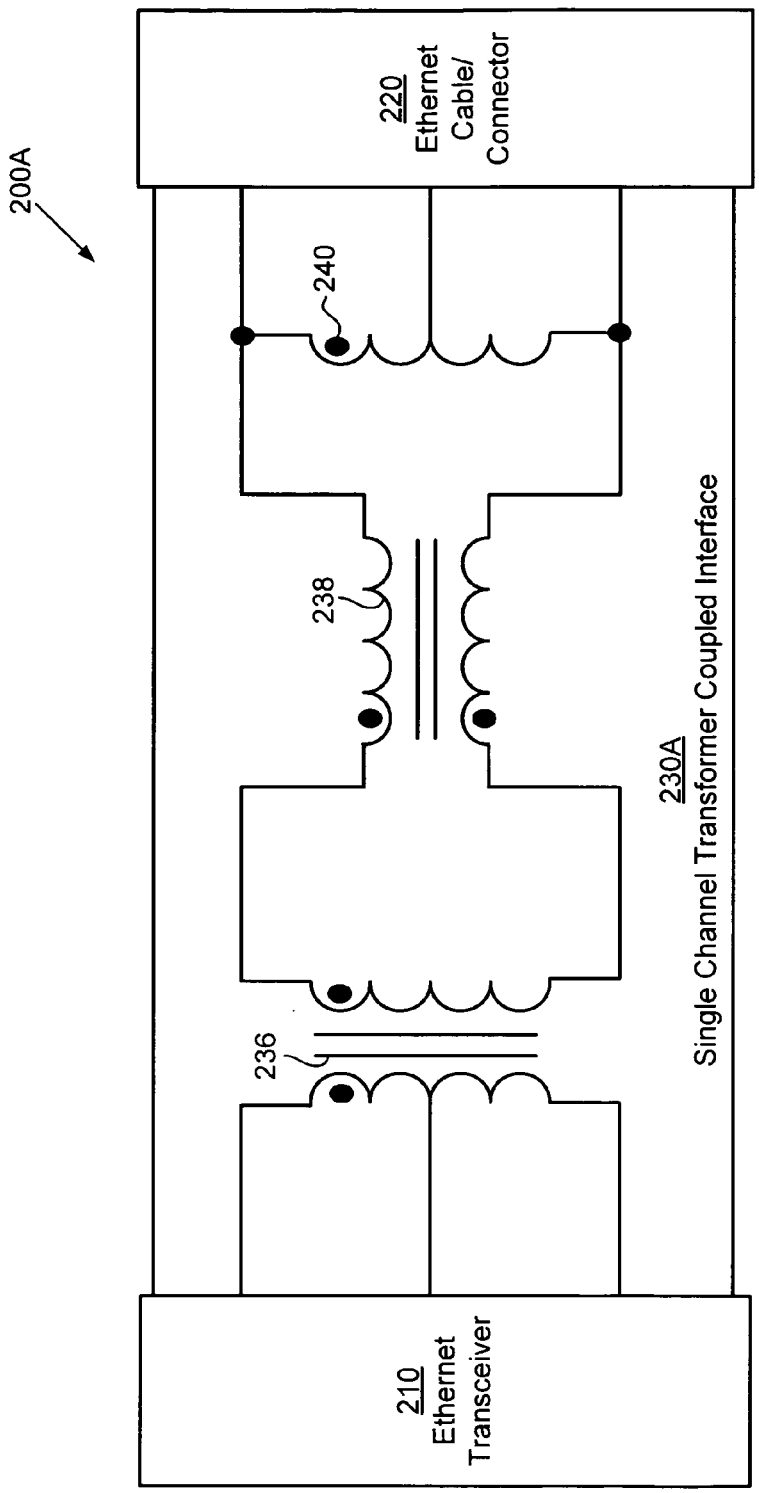
FIG. 2A illustrates a conventional communication connection.

FIG. 2A illustrates conventional communication connection 200A, which forms a part of many networking applications such as Standard Ethernet applications defined by the 802.xx-series of the Institute of Electrical and Electronics Engineers (IEEE) standards. As shown, conventional communication connection 200A may link Ethernet transceiver 210 and Ethernet cable/connector 220. Ethernet transceiver 210 may correspond to transceiver 110 in FIG. 1. Moreover, Ethernet cable/connector 220 in FIG. 2 may correspond to one of cables 120 in FIG. 1.

Conventional communication connection 200A in FIG. 2A may employ standards related to the 802.xx-standards promulgated by the Institute of Electrical and Electronics Engineers (IEEE), and may incorporate single-channel transformer-coupled interface 230A, which is adapted to process a differential signal from a twisted pair cable. Single-channel transformer coupled interface 230A may be a communication interface such as an Ethernet interface. Single-channel transformer coupled interface 230A may further comprise common-mode choke 238, transformer 236 coupled to common mode choke 238 and Ethernet transceiver 210, and autotransformer 240 coupled to common mode choke 238 and Ethernet cable/connector 220.

Transformer 236 may provide a high level of voltage isolation between Ethernet transceiver 210 and Ethernet cable/connector 220. Transformer 236 and autotransformer 240 may also minimize common-mode noise and help link the physical layers of Ethernet transceiver 210 and Ethernet cable/connector 220. For example, transformer 236 may be equipped with center-taps to utilize the center-taps for added common-mode suppression as well as for coupling direct current (DC) power in power-over-Ethernet applications. Some embodiments of single-channel transformer coupled interface 230A may omit autotransformer 240.

Each of transformer 236, common mode choke 238, and autotransformer 240 typically includes a magnetic core comprising a toroid core or a magnetic winding. A desire of many applications for larger port density often necessitates making the magnetic cores of transformer 236, common mode choke 238, and autotransformer 240 very small. Due to this small size, the magnetic cores of transformer 236, common mode choke 238, and autotransformer 240 may comprise hand-wound wires whose manufacture cannot be automated.

Figure 2B:
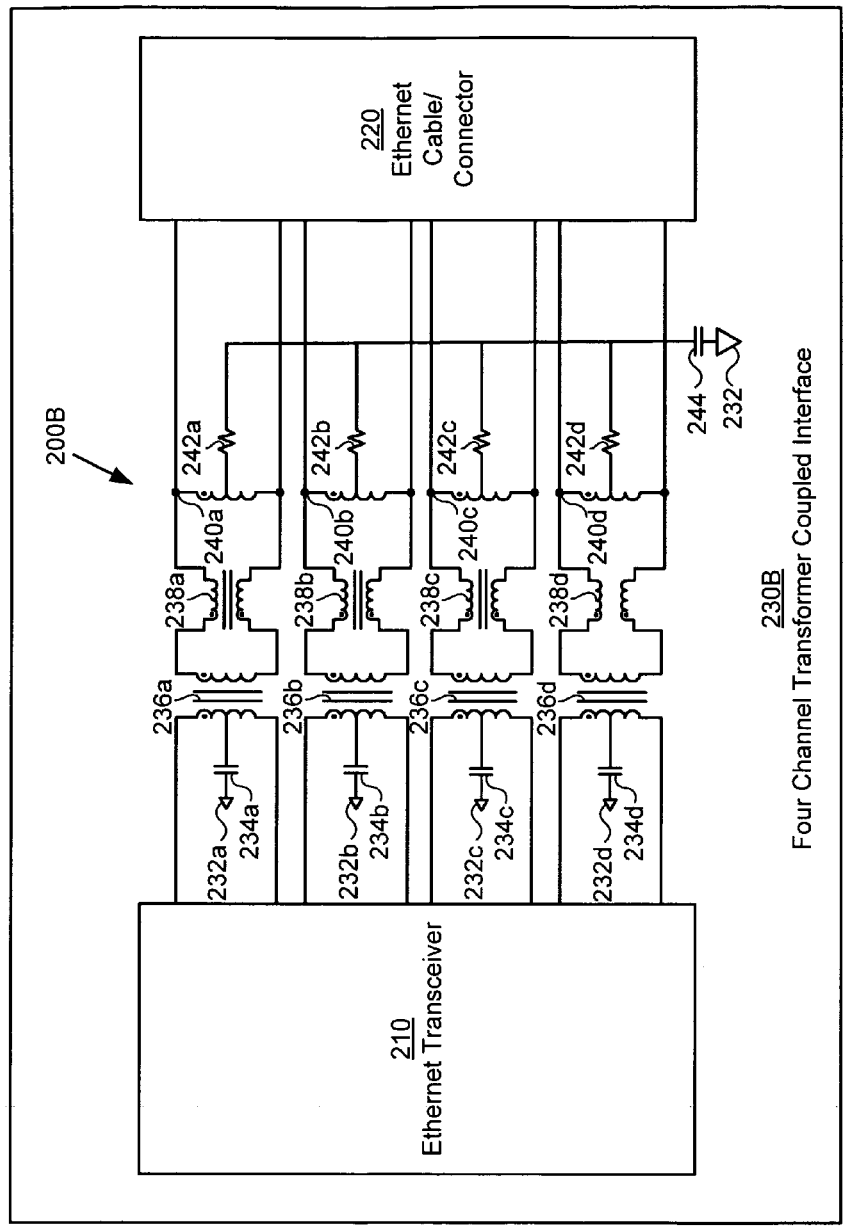
FIG. 2B shows a conventional four-channel connection, corresponding to a Standard Gigabit Ethernet connection.

A conventional communication connection may employ more than one communication channel. For example, FIG. 2B shows conventional four-channel connection 200B, corresponding to a standard Gigabit Ethernet connection including a Standard 100 Base T Ethernet interface. As shown in FIG. 2B, conventional four-channel connection 200B may link Ethernet transceiver 210 and Ethernet cable/connector 220. Ethernet transceiver 210 may correspond to transceiver 110 in FIG. 1. Moreover, Ethernet cable/connector 220 in FIG. 2 may correspond to one of Ethernet cables 120 in FIG. 1.

Conventional four-channel connection 200B may comprise four-channel transformer coupled interface 230B, which is shown as including four channels. Four-channel transformer coupled interface 230B may be a communication interface such as an Ethernet interface. Each channel of four-channel transformer coupled interface 230B has at least one transformer, one common mode choke, and one optional autotransformer. For example, four-channel transformer coupled interface 230B comprises a first channel. The first channel includes transformer 236a connected to Ethernet transceiver 210 and coupled to ground node 232a through center-tap capacitor 234a. The first channel further includes common mode choke 238a coupled to transformer 236a. The first channel also comprises autotransformer 240a connected to ground node 232 through center-tap resistor 242a and high voltage capacitor 244.

Conventional four-channel interface 200B may further comprise second, third, and fourth channels. The second channel comprises transformer 236b connected to Ethernet transceiver 210 and coupled to ground node 232b through center-tap capacitor 234b. The second channel further comprises common mode choke 238b coupled to transformer 236b. The second channel further includes autotransformer 240b connected to ground node 232 through center-tap resistor 242b and high voltage capacitor 244.

The third channel of four-channel transformer coupled interface 230B may comprise transformer 236c connected to Ethernet transceiver 210 and coupled to ground node 232c through center-tap capacitor 234c. The third channel also includes common mode choke 238c coupled to transformer 236c. The third channel further comprises autotransformer 240c connected to ground node 232 through center-tap resistor 242c and high voltage capacitor 244.

As shown in FIG. 2B, the fourth channel of four-channel transformer coupled interface 230B may comprise transformer 236d connected to Ethernet transceiver 210 and coupled to ground node 232d through center-tap capacitor 234d. The fourth channel also includes common mode choke 238d coupled to transformer 236d. The fourth channel further comprises autotransformer 240d connected to ground node 232 through center-tap resistor 242d and high voltage capacitor 244.

Like conventional single-channel connection 200A in FIG. 2A, conventional four-channel connection 200B in FIG. 2B typically requires hand-wound components. Each component of transformer 236a-236d, common mode chokes 238a-238d, and autotransformers 240a-240d, includes a magnetic core such as a toroid core and a magnetic winding. As with the magnetic cores in conventional communications interface 200A in FIG. 2A, the magnetic cores in conventional four-channel interface 200B in FIG. 2B comprise hand-wound wires whose manufacture cannot be automated. Thus, a typical communications interface such as conventional four-channel connection 200B may require, for example, sixteen or more hand-wound magnetic cores.

Unfortunately, a communications interface with a large number of hand-wound components faces at least several problems when adapted to mobile communications applications, such as automobile and other applications in harsh EMI environment where high EMI-rejection is required. First, hand-wound components tend to be more costly than components made with automated manufacturing processes. Second, hand-wound components are typically susceptible to manufacturing variations; a communications interface with a large number of hand-wound components may therefore be unable to meet the stricter EMI standards having low EMI requirements.

Third, hand-winding makes it difficult to balance center tap components, such as center tap capacitors 234a-234d, and therefore suppress the degree of EMI required for many mobile communications applications. Unfortunately, however, center tap components are also a source of imbalance, especially since they are hand-wound. Poor balance decreases EMI-rejection considerably. Controlling the balance of center tap components is therefore practically impossible when these components are produced manually, and has a consequence of poorly controlled EMI rejection. Finally, many mobile communications applications do not require high-voltage isolation, a property that may be required by conventional communications connections such as single-channel transformer coupled interface 230A in FIG. 2A and conventional four-channel transformer coupled interface 230B in FIG. 2B.

Figure 3A:
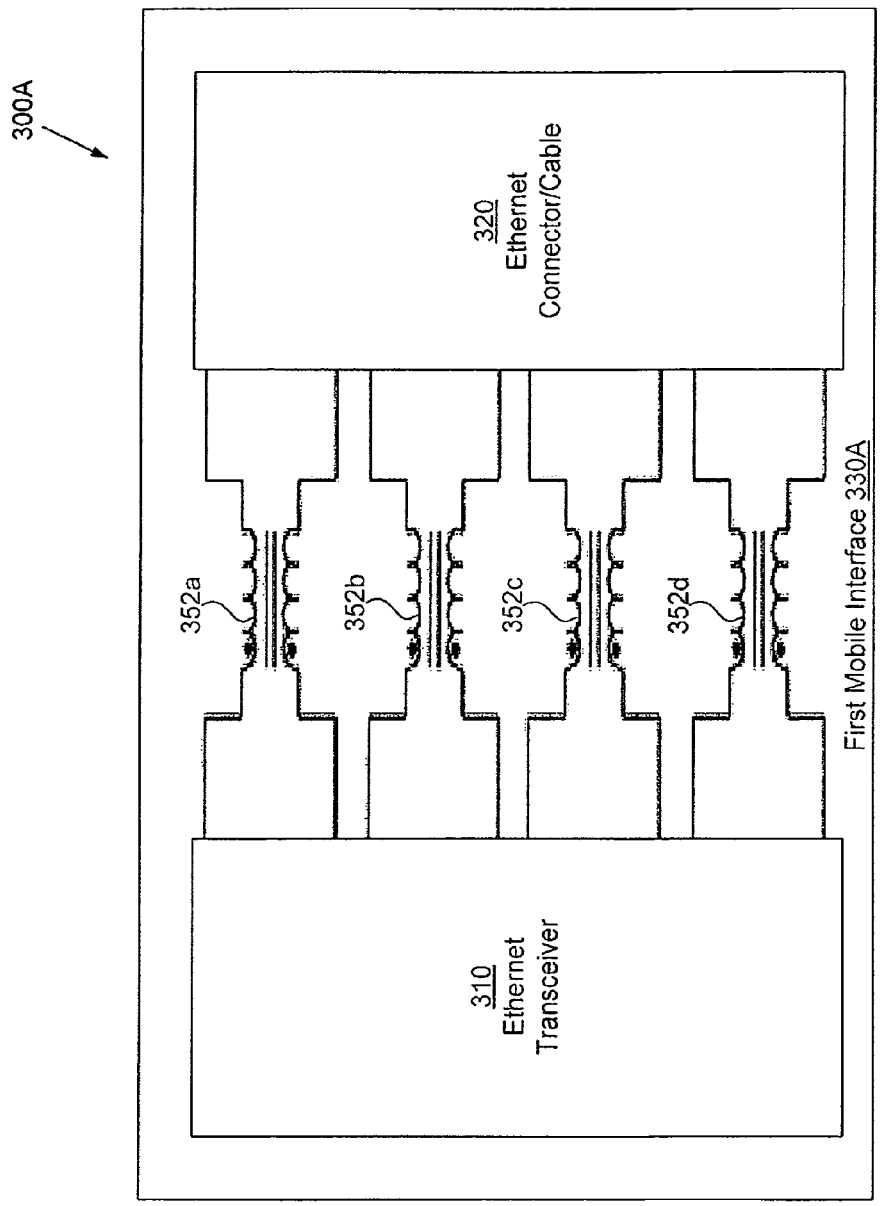
FIG. 3A shows a first mobile communications connection in accordance with one embodiment of the present invention

In view of these and other problems, FIG. 3A shows first mobile communications connection 300A in accordance with one embodiment of the present invention. As shown, first mobile communications connection 300A may facilitate communications between a first device and a second device. Either the first device or the second device may be an Ethernet hub/switch or a high EMI-rejection device such as an automotive Ethernet system. Either device may also comprise a processor (not shown) and a transceiver such as Ethernet transceiver 310 that is controlled by the processor. The first device and the second device may each comprise a mobile communications connection such as mobile communications connection 300A.

A medium such as Ethernet cable/connector 320 may facilitate communications over first mobile communications connection 300A. Ethernet cable/connector 320 may be a twisted-pair cable comprising at least one pair of wires, which may employ an unshielded twisted pair (UTP) or a shielded twisted pair (STP). According to an embodiment of the present invention, Ethernet transceiver 310 may reside within the first device. Additionally, first mobile communications connection 300A may be compatible with power over Ethernet.

As shown in FIG. 3A, first mobile communications connection 300A may comprise first mobile interface 330A, which may include one or more common mode chokes. First mobile interface 330A may be a communication interface such as an Ethernet interface. For example, first mobile interface 330A may comprise first common mode choke 352a, second common mode choke 352b, third common mode choke 352c, and fourth common mode choke 352d. As first mobile interface 330A need not have transformers, each of common mode chokes 352a-352d may be larger than the common mode chokes that are used in a conventional interface, such as single-channel transformer coupled interface 230A in FIG. 2A or four-channel transformer coupled interface 230B in FIG. 2B.

As shown in FIG. 3A, each of common mode chokes 352a-352d may have a first end configured to connect to Ethernet transceiver 310. A second end of each of common mode chokes 352a-352d may be connected to Ethernet connector/cable 320. In one embodiment, a single common mode choke may be connected to one pair of wires within the twisted pair cabling of Ethernet cable/connector 320. Alternatively, in another embodiment, a single common mode choke may be connected to more than one pair of wires within Ethernet cable/connector 320.

As further shown in FIG. 3A, first mobile interface 330A need not include any transformers connected to the second end of any of common mode chokes 352a-352d. Additionally, first mobile interface 330A need not include any transformers connected to the first end of any of common mode chokes 352a-352d. First mobile interface 330A also need not comprise autotransformers. Thus, first mobile interface 330A need not have any autotransformers connected to the first end of any of common mode chokes 352a-352d. Similarly, first mobile interface 330A need not have any autotransformers connected to the second end of any of common mode chokes 352a-352d. Accordingly, first mobile interface 330A need not require a transformer coupled interface.

Figure 3B:
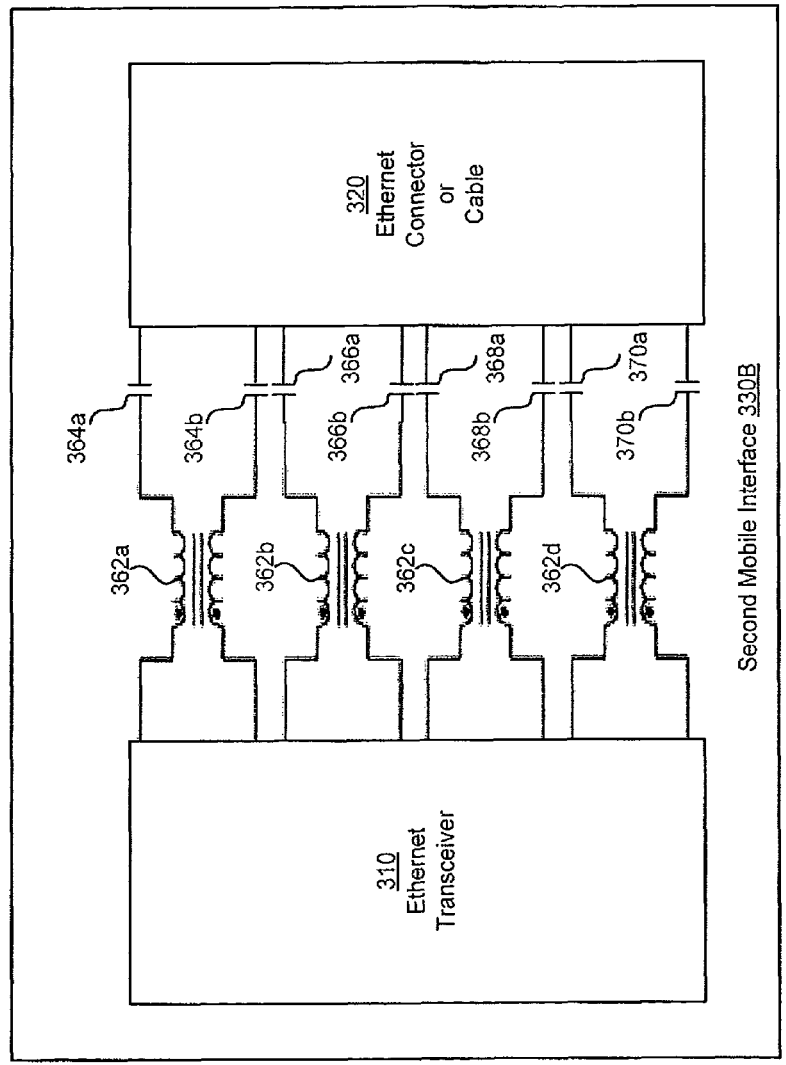
FIG. 3B shows a second mobile communications connection in accordance with a second embodiment of the present invention.

Another embodiment of the present invention may employ blocking capacitors. FIG. 3B shows second mobile communications connection 300B in accordance with a second embodiment of the present invention. As shown in FIG. 3B, second mobile communications connection 300B may facilitate communications between a first device and a second device. Either the first device or the second device may be an Ethernet hub/switch or a device with high EMI-rejection, such as an automotive Ethernet system. Either device may also comprise a processor (not shown) and a transceiver such as Ethernet transceiver 310 that is controlled by the processor. The first device and the second device may each comprise a mobile communications connection such as mobile communications connection 300B.

A medium such as Ethernet cable/connector 320 may facilitate communication within second mobile communications device 300B. Ethernet cable/connector 320 may be a twisted-pair cable comprising at least one pair of wires, which may employ an unshielded twisted pair (UTP) or a shielded twisted pair (STP). According to an embodiment of the present invention, Ethernet transceiver 310 may reside within the first device. Second mobile communications connection 300B may be compatible with power over Ethernet.

Second mobile communications connection 300B may comprise second mobile interface 330B, which may be a communications interface such as an Ethernet interface. Second mobile interface 330B may comprise one or more common mode chokes. For example, second mobile interface 330B may comprise first common mode choke 362a, second common mode choke 362b, third common mode choke 362c, and fourth common mode choke 362d. As second mobile interface 330B need not comprise transformers, each of common mode chokes 362a-362d may be larger than the common mode chokes in a conventional communications interface to allow for machine-winding and improve EMI-rejection and reduce cost, such as single-channel transformer coupled interface 230A in FIG. 2A or four-channel transformer coupled interface 230B in FIG. 2B.

As shown in FIG. 3B, each of common mode chokes 362a-362d may have a first end configured to connect to Ethernet transceiver 310. A second end of each of common mode chokes 362a-362d may be coupled to a first end of a capacitor. Moreover, second mobile interface 330B may comprise first capacitor 364a and second capacitor 364b with one end coupled to the second end of common mode choke 362a. Moreover, first capacitor 366a and second capacitor 366b may have one end coupled to the second end of common mode choke 362b. First capacitor 368a and second capacitor 368b may have one end coupled to the second end of common mode choke 362c. Second mobile interface 330B may also comprise first capacitor 370a and second capacitor 370b, where each capacitor has one end coupled to the second end of common mode choke 362d. As shown in FIG. 3B, a second end of capacitors 364a, 364b, 366a, 366b, 368a, 368b, 370a, and 370b may be coupled to Ethernet cable/connector 320.

As shown in the embodiment shown in FIG. 3B, capacitors 364a, 364b, 366a, 366b, 368a, 368b, 370a, and 370b may implement high pass filters by helping second mobile interface 300B limit the effect of lower frequency signals between Ethernet transceiver 310 and Ethernet cable/connector 320. The individual capacitances of capacitors 364a, 364b, 366a, 366b, 368a, 368b, 370a, and 370b may depend on the frequency spectrum of signals to be passed between Ethernet transceiver 310 and Ethernet cable/connector 320. For example, the individual capacitances of capacitors 364a, 364b, 366a, 366b, 368a, 368b, 370a, and 370b may correspond to approximately three (3) decibel (dB) cutoff frequency of the frequency spectrum of the high frequency signals that are required to be passed over second mobile connection interface 330B. The individual capacitances of capacitors 364a, 364b, 366a, 366b, 368a, 368b, 370a, and 370b may also depend on other filter parameters relating to the frequency spectrum of the signals that are passed over second mobile connection interface 330B.

As shown in FIG. 3B, a second end of each of common mode chokes 362a-362d may be coupled to Ethernet connector/cable 320. In one embodiment, a single common mode choke may be connected to one pair of wires within the twisted pair cabling of Ethernet cable/connector 320. Alternatively, in another embodiment, a single common mode choke may be connected to each of the pairs of wires within Ethernet cable/connector 320.

Within second mobile interface 330B, no transformers need be coupled to the second end of any of common mode chokes 362a-362d. As shown in FIG. 3B, second mobile interface 330B also need not include any transformers connected to the first end of any of common mode chokes 362a-362d. Second mobile interface 330B also need not have any autotransformers connected to the first end of any of common mode chokes 362a-362d, or to the second end of any of common mode chokes 362a-362d. Accordingly, second mobile interface 330B need not require a transformer coupled interface.

Embodiments of the present invention therefore create a beneficial interface that is readily adaptable to mobile communications applications having high EMI-rejection requirement, such as automotive, aero-space, air crafts, water crafts, trains, railroad and marine applications. For example, removing transformers and autotransformers eliminates center-tap imbalances that plagued conventional interfaces. Moreover, using a common mode choke allows using only one core per channel, and decreases the cost of an interface. Notably, embodiments of the present invention do not require hand-wound components such as transformers or autotransformers and therefore decrease the cost and improve the performance of a communications interface.

Rather, the relatively large common-mode chokes of the present invention can be manufactured according to automated processes and are often cheaper than the hand-wound components that are employed in conventional communications interfaces. The relatively large common mode chokes effectively suppress EMI without the delicate center tap capacitor balancing that characterizes conventional communications interfaces. Such a large common mode choke improves performance and can be sized to a conventional package.

The manufacturing process for such a larger common mode choke is less expensive and more consistent than the process for conventional interfaces. Moreover, embodiments of the present invention reduce the component count of a communications interface by eliminating center tap capacitors and requiring only one core per differential pair.

If needed, a DC-block between a device and a cable can be achieved with inexpensive capacitors that are connected in series with the signal lines. Such capacitors may be rated only for the required low-voltage and may therefore comprise inexpensive and readily available electronic components. To further reduce the component count, multiple cores can be shared by winding two or more pairs on the same core. Though such an embodiment may limit EMI performance, such an embodiment may still offer reduced cost and decreased EMI over a conventional interface.

From the above description of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An Ethernet interface to connect to a first device and to establish a communication between the first device and a second device over a medium, the first device or the second device is being a high electromagnetic interference (EMI)-rejection device, the Ethernet interface comprising: a plurality of common mode chokes sharing a common core and each having a first end directly connected to an Ethernet transceiver of the first device; and a plurality of capacitors each having a first terminal directly coupled to a second end of a respective one of the plurality of common mode chokes and having a second terminal directly connected to the medium, wherein the Ethernet interface does not include any transformers or autotransformers.

2. The Ethernet interface of claim 1, wherein the medium is a differential-pair cable comprising a plurality of pairs of wires, and there is at least one capacitor in each line of a differential pair.

3. The Ethernet interface of claim 2, wherein:
each pair of the plurality of pairs of wires connects to a respective one of the plurality of common mode chokes.

4. The Ethernet interface of claim 1, wherein each of the plurality of capacitors has a capacitance corresponding to a cutoff frequency of a signal passed over the Ethernet interface.

5. The Ethernet interface of claim 4, wherein the cutoff frequency comprises approximately a three decibel (dB) cutoff frequency of the Ethernet interface.

6. The Ethernet interface of claim 1, wherein the high EMI-rejection device is integrated into one of automotive, aero-space, aircrafts, water crafts, trains, railroad and marine application.

7. A first device to establish a communication with a second device over a medium, the first device comprising: an Ethernet transceiver; and a communication interface including: a plurality of common mode chokes sharing a common core and each having a first end directly connected to the transceiver; and a plurality of capacitors each having a first terminal directly coupled to a second end of a respective one of the plurality of common mode chokes and having a second terminal directly connected to the medium, wherein the communication interface does not include any transformers or autotransformers and wherein the first device or the second device is being used to a high electromagnetic interference (EMI)-rejection device.

8. The first device of claim 7, wherein the medium is a twisted-pair cable comprising a plurality of pairs of wires.

9. A computer system to establish a communication between a first device and a second device over a medium, the first device or the second device is being a high electromagnetic interference (EMI)-rejection device, the computer system comprising: a processor; an Ethernet transceiver being controlled by the processor of the first device; and a communication interface including: a plurality of common mode chokes sharing a common core and each having a first end directly connected to the transceiver; and a plurality of capacitors each having a first terminal coupled directly to a second end of a respective one of the common mode chokes and having a second terminal directly connected to the medium, wherein the communication interface does not include any transformers or autotransformers.

10. The computer system of claim 9, wherein the medium is a twisted-pair cable comprising a plurality of pairs of wires.

11. The computer system of claim 9, wherein the high electromagnetic interference (EMI)-rejection device is integrated into one of automotive, aero-space, aircrafts, water crafts, trains, railroad and marine application.

* * * * *